US010782399B2

(12) United States Patent
Lee et al.

(10) Patent No.: US 10,782,399 B2
(45) Date of Patent: Sep. 22, 2020

(54) OBJECT DETECTING METHOD AND APPARATUS USING LIGHT DETECTION AND RANGING (LIDAR) SENSOR AND RADAR SENSOR

(71) Applicant: Daegu Gyeongbuk Institute of Science and Technology, Dalseong-gun, Daegu (KR)

(72) Inventors: Jong Hun Lee, Daegu (KR); Seong Kyung Kwon, Gyeongsangbuk-do (KR); Sang Hyuk Son, Daegu (KR); Eugin Hyun, Daegu (KR); Jin Hee Lee, Daegu (KR)

(73) Assignee: Daegu Gyeongbuk Institute of Science and Technology, Dalseong-gun, Daegu (KR)

( * ) Notice: Subject to any disclaimer, the term of this patent is extended or adjusted under 35 U.S.C. 154(b) by 378 days.

(21) Appl. No.: 15/618,662

(22) Filed: Jun. 9, 2017

(65) Prior Publication Data
US 2017/0356993 A1    Dec. 14, 2017

(30) Foreign Application Priority Data

Jun. 9, 2016    (KR) .................. 10-2016-0071664

(51) Int. Cl.
*G01S 13/86*    (2006.01)
*G01S 13/93*    (2020.01)
(Continued)

(52) U.S. Cl.
CPC .......... *G01S 13/865* (2013.01); *G01S 7/415* (2013.01); *G01S 7/4802* (2013.01); *G01S 13/93* (2013.01); *G01S 17/93* (2013.01)

(58) Field of Classification Search
CPC ...... G01S 13/865; G01S 13/93; G01S 7/4802; G01S 17/93; G01S 7/415
See application file for complete search history.

(56) References Cited

U.S. PATENT DOCUMENTS 7,142,150 B2 * 11/2006 Thackray .................. G01S 7/41
342/54
9,723,293 B1 * 8/2017 Cederlof ............ G01B 11/2513
(Continued)

FOREIGN PATENT DOCUMENTS

JP    2011-065400 A    3/2011
JP    2016145817        8/2016
(Continued)

OTHER PUBLICATIONS

Korean Written Decision on Registration for Korean Application No. 10-2016-0071664, dated Sep. 22, 2017, 2 pages with English Translation.

*Primary Examiner* — Matthew M Barker
(74) *Attorney, Agent, or Firm* — TraskBritt (57) ABSTRACT

Provided is an object detecting method and apparatus using a light detection and ranging (LIDAR) sensor and a radar sensor, the method may include collecting LIDAR data and radar data associated with a search region in which objects are to be found using the LIDAR sensor and radar sensor, extracting each of objects present within the search region based on the collected LIDAR data and radar data, generating shadow regions of objects extracted through the LIDAR sensor and setting an ROI of LIDAR sensor based on the extracted objects, setting an ROI of radar sensor based on a reflectivity depending on a range and a movement speed of moving object among the objects extracted through the radar sensor, comparing the ROI of the LIDAR sensor to the ROI of the radar sensor, and verifying whether the moving object is present based on a result of the comparing.

13 Claims, 4 Drawing Sheets

(51) Int. Cl.
   *G01S 17/93*    (2020.01)
   *G01S 7/41*     (2006.01)
   *G01S 7/48*     (2006.01)

(56) References Cited

U.S. PATENT DOCUMENTS

| | | | | |
|---|---|---|---|---|
| 2011/0116684 | A1* | 5/2011 | Coffman | G06T 7/277 382/103 |
| 2012/0106785 | A1* | 5/2012 | Karafin | G06T 11/00 382/103 |
| 2013/0265189 | A1* | 10/2013 | Chang | G01S 17/87 342/52 |
| 2016/0180177 | A1* | 6/2016 | Nguyen | G06K 9/00798 382/104 |
| 2017/0115387 | A1* | 4/2017 | Luders | G01S 7/4972 |
| 2017/0345311 | A1* | 11/2017 | Sugiura | G08G 1/167 |
| 2018/0194354 | A1* | 7/2018 | Takeda | B60K 31/00 |

FOREIGN PATENT DOCUMENTS

| | | |
|---|---|---|
| JP | 6064674 | 1/2017 |
| KR | 20100128849 | 12/2010 |
| KR | 10-1354681 B1 | 2/2014 |
| KR | 10-2015-0099874 A | 9/2015 |
| KR | 20160017400 | 2/2016 |
| KR | 101714233 | 3/2017 |
| WO | 2007011391 A2 | 1/2007 |

\* cited by examiner

OBJECT DETECTING METHOD AND APPARATUS USING LIGHT DETECTION AND RANGING (LIDAR) SENSOR AND RADAR SENSOR

CROSS-REFERENCE TO RELATED APPLICATION

This application claims the priority benefit of Korean Patent Application No. 10-2016-0071664 filed on Jun. 9, 2016, in the Korean Intellectual Property Office, the disclosure of which is hereby incorporated herein in its entirety by this reference for all purposes.

TECHNICAL FIELD

One or more example embodiments relate to a method and apparatus of verifying whether an object extracted by a light detection and ranging (LIDAR) sensor and a radar sensor is a moving object by minimizing an operation amount of algorithm based on a method of detecting a partially occluded object using a LIDAR sensor and a radar sensor.

BACKGROUND

A general object detecting method mainly uses a light detection and ranging (LIDAR) sensor and a camera. However, the LIDAR sensor may have difficulty recognizing a color of a target to be detected, and the camera may be sensitive to a light brightness change and take a great amount of time processing.

In addition, even though an object detecting method may accurately classify a target, the method of combining a LIDAR sensor and a camera may have a problem that sensors are sensitive to light such that detection accuracy may differ depending on circumstances. The method may use a relatively long period of time processing and require low detection accuracy when a partially occluded object is detected.

However, a radar sensor may be unable to classify a color and a type of a target and may have a relatively narrow search range. Also, the object detecting method of combining the radar sensor and the camera may have a relatively narrow search range and may have difficulty obtaining accurate information on a position of a target to be detected, such that it is difficult to use the method at nighttime.

BRIEF SUMMARY

An aspect provides a method and apparatus of detecting a partially occluded object by reducing an amount of time processing and an operation amount using an object detecting apparatus in which a light detection and ranging (LIDAR) sensor and a radar sensor.

According to an aspect, there is provided an object detecting method using a light detection and ranging (LIDAR) sensor and a radar sensor including collecting LIDAR data and radar data associated with a search region in which objects are to be found using the LIDAR sensor and the radar sensor, extracting each of the objects present within the search region based on the collected LIDAR data and the collected radar data, generating shadow regions of the objects extracted through the LIDAR sensor and setting a region of interest (ROI) of the LIDAR sensor based on the extracted objects, setting an ROI of the radar sensor based on a reflectivity depending on a range and a movement speed of a moving object among the objects extracted through the radar sensor, comparing the ROI of the LIDAR sensor to the ROI of the radar sensor, and verifying whether the moving object is present based on a result of the comparing of the ROI of the LIDAR sensor to the ROI of the radar sensor.

The comparing may include verifying whether the ROI of the LIDAR sensor overlaps the ROI of the radar sensor, and the verifying may include verifying that the moving object is present within an overlapping ROI based on verification that the ROI of the LIDAR sensor overlaps the ROI of the radar sensor.

The comparing may include verifying whether a shadow region associated with the LIDAR sensor overlaps the ROI of the radar sensor when the set ROI of the LIDAR sensor does not overlap the ROI of the radar sensor, and the verifying may include verifying that the moving object is present within an overlapping shadow region based on verification that the shadow region associated with the LIDAR sensor overlaps the ROI of the radar sensor.

The method may further include displaying the moving object, and the displaying may include displaying the moving object on a display of the LIDAR sensor based on information on a horizontal angle of the moving object extracted through the LIDAR sensor and information on a range from the radar sensor to the moving object extracted through the radar sensor.

The setting of the ROI of the LIDAR sensor may include setting a lateral size of the ROI of the LIDAR sensor to be a predetermined size determined based on a unique accuracy of the LIDAR sensor, and variably setting a longitudinal size of the ROI of the LIDAR sensor based on a relative range between a target and the LIDAR sensor.

The setting of the ROI of the radar sensor may include setting a longitudinal size of the ROI of the radar sensor to be a predetermined size determined based on a unique accuracy of the radar sensor, and variably setting a lateral size of the ROI of the radar sensor based on a relative range between a target and the radar sensor.

The method may further include correcting errors of coordinates associated with the LIDAR data received from the LIDAR sensor and the radar data received from the radar sensor based on offsets caused by initial locations of the LIDAR sensor and the radar sensor, and the extracting may include extracting each of the objects present within the search range based on the LIDAR data and the radar data in which the errors of coordinates are corrected.

According to another aspect, there is provided an object detecting apparatus using a light detection and ranging (LIDAR) sensor and a radar sensor including a collector configured to collect LIDAR data and radar data associated with a search region in which objects are to be found using the LIDAR sensor and the radar sensor, an extractor configured to extract each of the objects present within the search region based on the collected LIDAR data and the collected radar data, a setter configured to generate shadow regions of the objects extracted through the LIDAR sensor, set a region of interest (ROI) of the LIDAR sensor based on the extracted objects, and set an ROI of the radar sensor based on a reflectivity depending on a range and a movement speed of a moving object among the objects extracted through the radar sensor, a comparer configured to compare the ROI of the LIDAR sensor to the ROI of the radar sensor, and a verifier configured to verify whether the moving object is present based on a result of the comparing of the ROI of the LIDAR sensor to the ROI of the radar sensor.

The comparer may be configured to verify whether the ROI of the LIDAR sensor overlaps the ROI of the radar sensor, and the verifier is configured to verify that the moving object is present within an overlapping ROI based on verification that the ROI of the LIDAR sensor overlaps the ROI of the radar sensor.

The comparer may be configured to verify whether a shadow region associated with the LIDAR sensor overlaps the ROI of the radar sensor when the set ROI of the LIDAR sensor does not overlap the ROI of the radar sensor, and the verifier is configured to verify that the moving object is present within an overlapping shadow region based on verification that the shadow region associated with the LIDAR sensor overlaps the ROI of the radar sensor.

The apparatus may further include a displayer configured to display the moving object, and the displayer may be configured to display the moving object on a display of the LIDAR sensor based on information on a horizontal angle of the moving object extracted through the LIDAR sensor and information on a range from the radar sensor to the moving object extracted through the radar sensor.

The setter may be configured to set a lateral size of the ROI of the LIDAR sensor to be a predetermined size determined based on a unique accuracy of the LIDAR sensor, and variably set a longitudinal size of the ROI of the LIDAR sensor based on a relative range between a target and the LIDAR sensor.

The setter may be configured to set a longitudinal size of the ROI of the radar sensor to be a predetermined size determined based on a unique accuracy of the radar sensor, and variably set a lateral size of the ROI of the radar sensor based on a relative range between a target and the radar sensor.

The apparatus may further include a corrector configured to correct errors of coordinates associated with the LIDAR data received from the LIDAR sensor and the radar data received from the radar sensor based on offsets caused by initial locations of the LIDAR sensor and the radar sensor, and the extractor may be configured to extract each of the objects present within the search range based on the LIDAR data and the radar data in which the errors of coordinates are corrected.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Particular structural or functional descriptions of example embodiments according to the concept of the present disclosure disclosed in the present disclosure are merely intended for the purpose of describing the example embodiments and the example embodiments may be implemented in various forms and should not be construed as being limited to those described in the present disclosure.

Though example embodiments according to the concept of the present disclosure may be variously modified and be several example embodiments, specific example embodiments will be shown in drawings and be explained in detail. However, the example embodiments are not meant to be limited, but it is intended that various modifications, equivalents, and alternatives are also covered within the scope of the claims.

Although terms of "first," "second," etc., are used to explain various components, the components are not limited to such terms. These terms are used only to distinguish one component from another component. For example, a first component may be referred to as a second component, or similarly, the second component may be referred to as the first component within the scope of the right according to the concept of the present disclosure.

When it is mentioned that one component is "connected" or "coupled" to another component, it may be understood that the one component is directly connected or coupled to another component or that still other component is interposed between the two components. Also, when it is mentioned that one component is "directly connected" or "directly coupled" to another component, it may be understood that no component is interposed therebetween. Expressions used to describe the relationship between components should be interpreted in a like fashion, for example, "between" versus "directly between," or "adjacent to" versus "directly adjacent to."

The terminology used herein is for the purpose of describing particular example embodiments only and is not intended to be limiting of example embodiments. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings. The scope of the right, however, should not be construed as limited to the example embodiments set forth herein. Regarding the reference numerals assigned to the elements in the drawings, it should be noted that the same elements will be designated by the same reference numerals.

Figure 1:
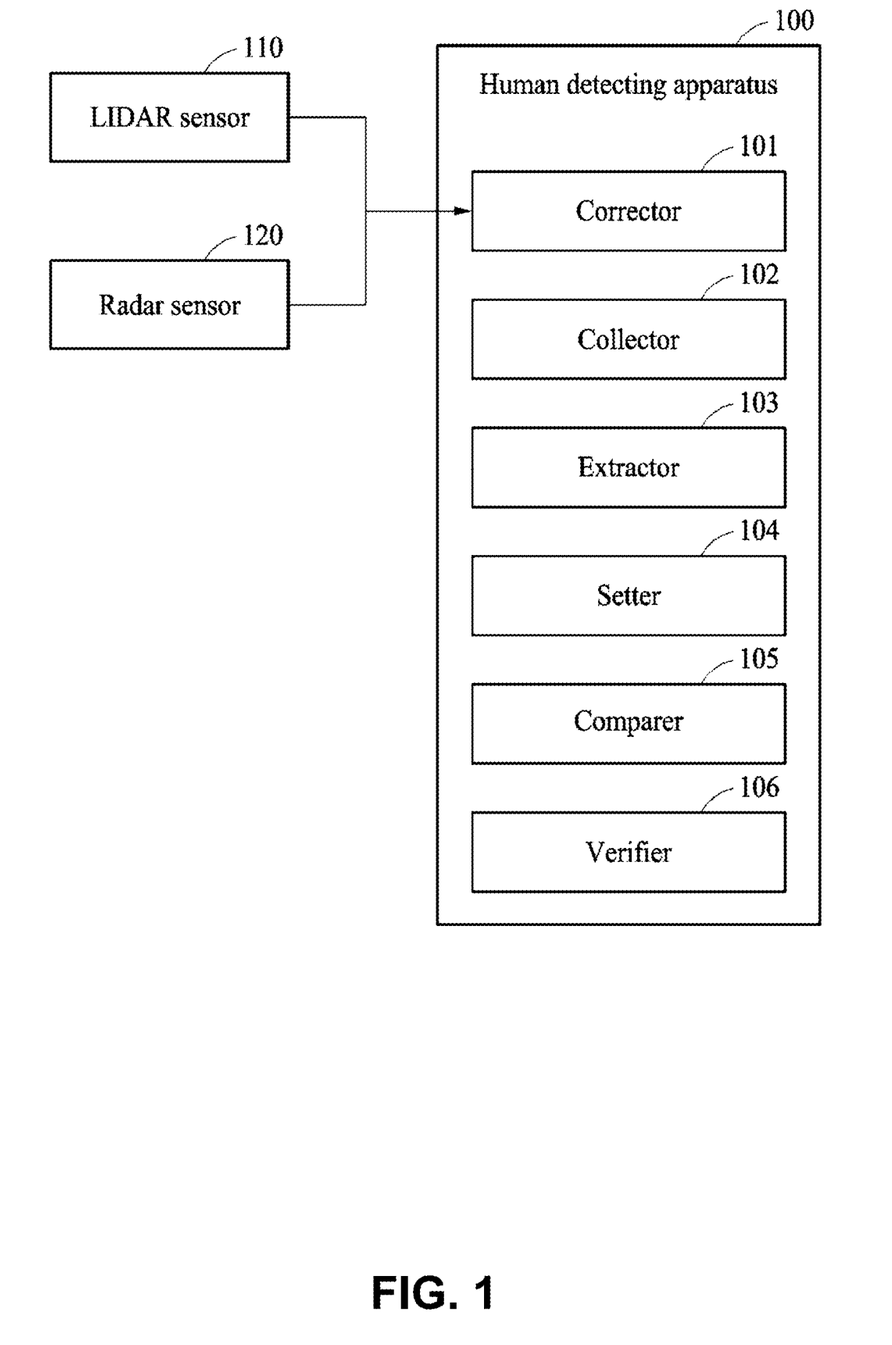
FIG. 1 is a block diagram illustrating an object detecting apparatus according to an example embodiment.

FIG. 1 is a block diagram illustrating an object detecting apparatus according to an example embodiment.

An object detecting apparatus 100 includes a corrector 101, a collector 102, an extractor 103, a setter 104, a comparer 105, and a verifier 106. The object detecting apparatus 100 may comprise a processor, and the processor may perform the functions of the corrector 101, the collector 102, the extractor 103, the setter 104, the comparer 105, and the verifier 106.

The corrector 101 corrects errors of coordinates associated with light detection and ranging (LIDAR) data received from a LIDAR sensor 110 and radar data received from a radar sensor 120 based on offsets caused by initial locations of the LIDAR sensor 110 and the radar sensor 120.

In general, the LIDAR data obtainable through the LIDAR sensor 110 may be represented in a Cartesian coordinate system, and the radar data obtainable through the radar sensor 120 may be represented in a polar coordinate system. Thus, to detect an object using the object detecting apparatus 100 in which the LIDAR sensor 110 and the radar sensor 120 are combined, the radar data obtained through the radar sensor 120 may be displayed by converting the radar data in the Cartesian coordinate system. Thus, the corrector 101 may include a method of converting the polar coordinate system to the Cartesian coordinate system. Here, the LIDAR sensor 110 and the radar sensor 120 may be included in the object detecting apparatus 100 or may be separated from the object detecting apparatus 100.

Even though the LIDAR sensor 110 and the radar sensor 120 detect an identical object based on the initial locations, the obtainable LIDAR data and the radar data may have different values. Thus, the corrector 101 may correct the errors of the coordinates associated with the LIDAR data received from the LIDAR sensor 110 and the radar data received through the radar sensor 120 based on the offsets caused by the initial locations of the LIDAR sensor 110 and the radar sensor 120.

Since the LIDAR sensor 110 shows a better range accuracy than the radar sensor 120, the corrector 101 may correct the errors of the coordinates associated with the LIDAR data and the radar data based on the LIDAR sensor 110. However, the corrector 101 may correct the errors of the coordinates based on the LIDAR sensor 110 when the LIDAR sensor 110 operates within an operation range based on an effective light intensity. Otherwise, the corrector 101 may correct the errors of the coordinates based on the radar sensor 120.

The collector 102 collects the LIDAR data and the radar data associated with a search region in which objects are to be found. Here, the LIDAR data and the radar data collected by the collector 102 may be corrected based on the offsets caused by the initial locations of the LIDAR sensor 110 and the radar sensor 120.

Here, the LIDAR data collected through the LIDAR sensor 110 may have multiple scattering points with respect to an identical object. The radar data collected through the radar sensor 120 may have a single scattering point with respect to an identical object.

The extractor 103 extracts each of the objects present within the search region based on the collected LIDAR data and the collected radar data. A plurality of objects may be present in the search region. Even though the LIDAR sensor 110 may be unable to detect other objects at the back of the extracted objects, the radar sensor 120 may be capable of detecting other objects at the back of the extracted objects.

The setter 104 sets a region of interest (ROI) of the LIDAR sensor 110 and an ROI of the radar sensor 120 based on each of the objects extracted by the extractor 103. Here, an ROI is a region in which an object is estimated to be present. The setter 104 may generate shadow regions as back portions of the extracted objects based on the collected LIDAR data. A shadow region may indicate a region through which a laser signal output by the LIDAR sensor 110 does not pass from the search region. Subsequently, based on the collected LIDAR data, the setter 104 may generate an object map that is mapped in order to represent the LIDAR data on a display as an image based on the extracted objects, and set the ROIs based on Cartesian coordinates corresponding to the extracted objects. Here, the ROI may indicate a region in which an object is estimated to be present based on the collected LIDAR data.

In detail, the setter 104 may set the ROI of each of the LIDAR sensor 110 and the radar sensor 120 based on different methods. The LIDAR sensor 110 may have a better lateral range accuracy. Thus, the setter 104 may set a lateral size of the ROI of the LIDAR sensor 110 to be a predetermined size determined based on a unique accuracy feature of the LIDAR sensor 110. The setter 104 may variably set a longitudinal size of the ROI based on a relative range between a target and the LIDAR sensor 110. That is, the setter 104 may increase the longitudinal size of the ROI by applying a predetermined weight based on the relative range between the target and the LIDAR sensor 110.

Unlike the LIDAR sensor 110, the radar sensor 120 may have a better longitudinal range accuracy. Thus, the setter 104 may set a longitudinal size of the ROI of the radar sensor 120 to be a predetermined size determined based on a unique accuracy feature of the radar sensor 120. The setter 104 may variably set a lateral size of the ROI based on a relative range between the target and the radar sensor 120. That is, the setter 104 may increase the lateral size of the ROI by applying the predetermined weight based on the relative range between the target and the radar sensor 120.

Subsequently, the setter 104 may differentiate a static object from objects moving in response to speeds of the extracted objects based on the received radar data. Here, the setter 104 may set the ROIs based on a radar cross section (RCS) depending on a range and a movement speed of the moving object.

The comparer 105 compares the set ROI of the LIDAR sensor 110 to the set ROI of the radar sensor 120. In more detail, the comparer 105 may verify whether the ROI of the LIDAR sensor 110 overlaps the ROI of the radar sensor 120, and transfer a result of the verification to the verifier 106. When the ROI of the LIDAR sensor 110 does not overlap the ROI of the radar sensor 120, the comparer 105 may additionally compare a shadow region associated with the LIDAR sensor 110 to the ROI of the radar sensor 120. Subsequently, the comparer 105 may verify whether the shadow region associated with the LIDAR sensor 110 overlaps the ROI of the radar sensor 120, and transfer a result of the verification to the verifier 106.

The verifier 106 verifies whether the extracted objects are moving objects based on a result of the comparing of the ROI of the LIDAR sensor 110 to the ROI of the radar sensor 120. In detail, the verifier 106 may verify that the moving object is present in the shadow region or the ROI of the LIDAR sensor 110 that overlaps the ROI of the radar sensor 120 set by the setter 104.

FIGS. 2A through 2D illustrate objects measured through a LIDAR sensor are represented in displays according to an example embodiment.

The present disclosure proposes a method of detecting a partially occluded object by reducing an amount of time processing and an operation amount using the object detecting apparatus 100 in which the LIDAR sensor 110 and the radar sensor 120 are combined.

For example, a three-dimensional (3D) LIDAR sensor, for example, the LIDAR sensor 110, may include a plurality of two-dimensional (2D) LIDAR channels based on a vertical angular resolution. Here, LIDAR data obtained through the 3D LIDAR sensor may include information on a range for each channel (angle). Radar data obtained through one-dimensional (1D) radar sensor, for example, the radar sensor 120, may include information on a measurement time, information on a range from an object, and information on a speed. Here, information on a height, a thickness, and a width of an object may be obtained based on range information measured through the 3D LIDAR sensor, and the information on the range from the object and the information on the speed may be measured based on the radar data obtained through the 1D radar sensor.

The LIDAR sensor 110 may emit light and calculate the range from the object based on a time of flight of the emitted light reflected by an object. Thus, when the object is occluded by another obstacle, it may be difficult detecting the object using the LIDAR sensor 110. Here, a region occluded by a predetermined obstacle is referred to as a shadow region, and an object to be measured may be present or absent in the shadow region.

Figure 2A:
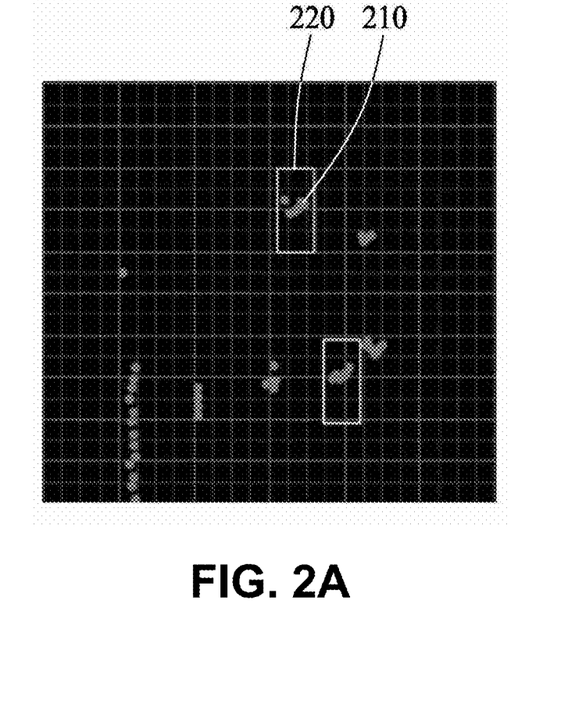
FIGS. 2A through 2D illustrate objects measured through a light detection and ranging (LIDAR) sensor are represented in displays according to an example embodiment.
Figure 2B:
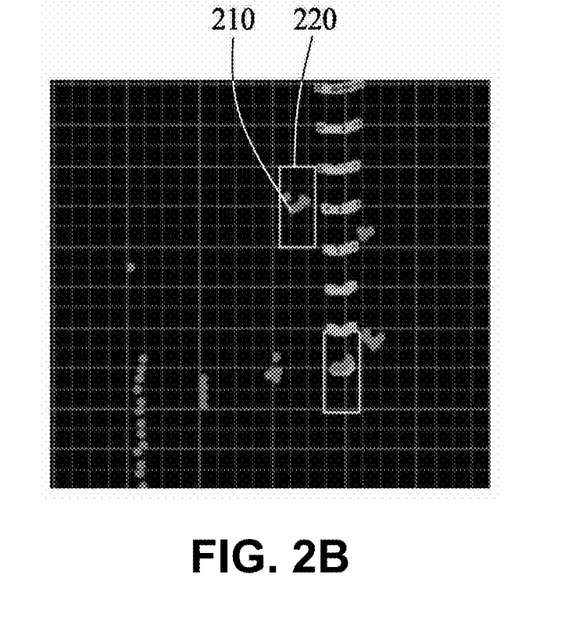

FIGS. 2A and 2B illustrate examples in which a region of interest (ROI) of the LIDAR sensor 110 corresponds to an ROI of the radar sensor 120. FIG. 2A illustrates an example in which a shadow region of an object extracted through the LIDAR sensor 110 is not generated, and FIG. 2B illustrates an example in which the shadow region of the object extracted through the LIDAR sensor 110 is generated. Here, the object extracted through the LIDAR sensor 110 may be represented by a plurality of points on a display, and the object detecting apparatus 100 may set the points as an ROI 210 of the LIDAR sensor 110.

The radar sensor 120 may extract a moving object present within a search region using a radar signal, and set an ROI 220 of the radar sensor 120 based on the moving object.

The object detecting apparatus 100 may verify that the moving object is present in a corresponding region because the ROI 210 of the LIDAR sensor 110 corresponds to the ROI 220 of the radar sensor 120 as illustrated in FIGS. 2A and 2B.

Figure 2C:
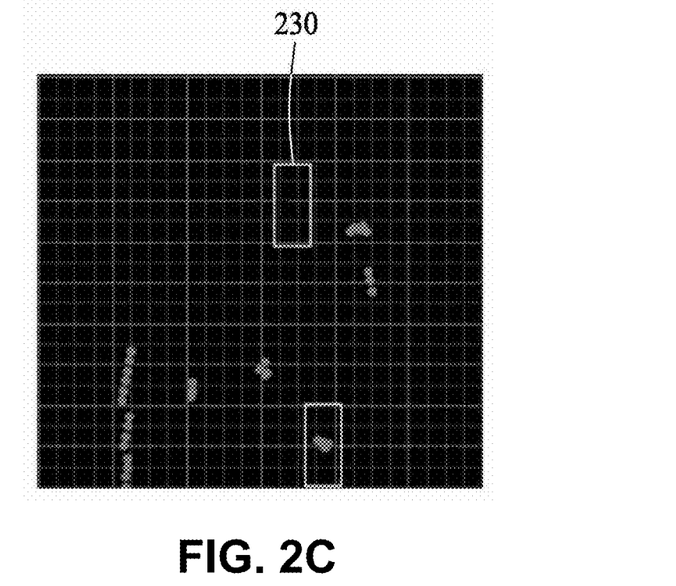
Figure 2D:
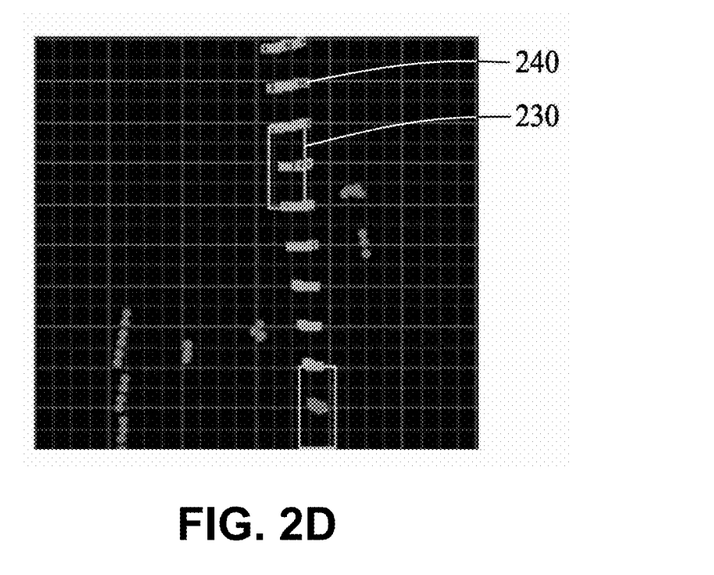

FIGS. 2C and 2D illustrate examples in which an ROI of the LIDAR sensor 110 does not correspond to an ROI of the radar sensor 120. FIG. 2C illustrates an example in which a shadow region of an object extracted through the LIDAR sensor 110 is not generated, and FIG. 2D illustrates an example in which the shadow region of the object extracted through the LIDAR sensor 110 is generated. Here, the object detecting apparatus 100 may primarily verify that a moving object is absent in a corresponding region because a corresponding ROI region of the LIDAR sensor 110 is absent within an ROI 230 of the radar sensor 120 as illustrated in FIG. 2C.

However, the object detecting apparatus 100 may verify that the moving object is present in the corresponding ROI 230 of the radar sensor 120 because a corresponding region is present based on a result of comparing a shadow region 240 associated with the LIDAR sensor 110 to the ROI 230 of the radar sensor 120.

The present disclosure may propose a method of detecting a partially occluded object by decreasing an amount of time processing and an operation amount of the LIDAR sensor 110 using a shadow region associated with the LIDAR sensor 110.

Figure 3:
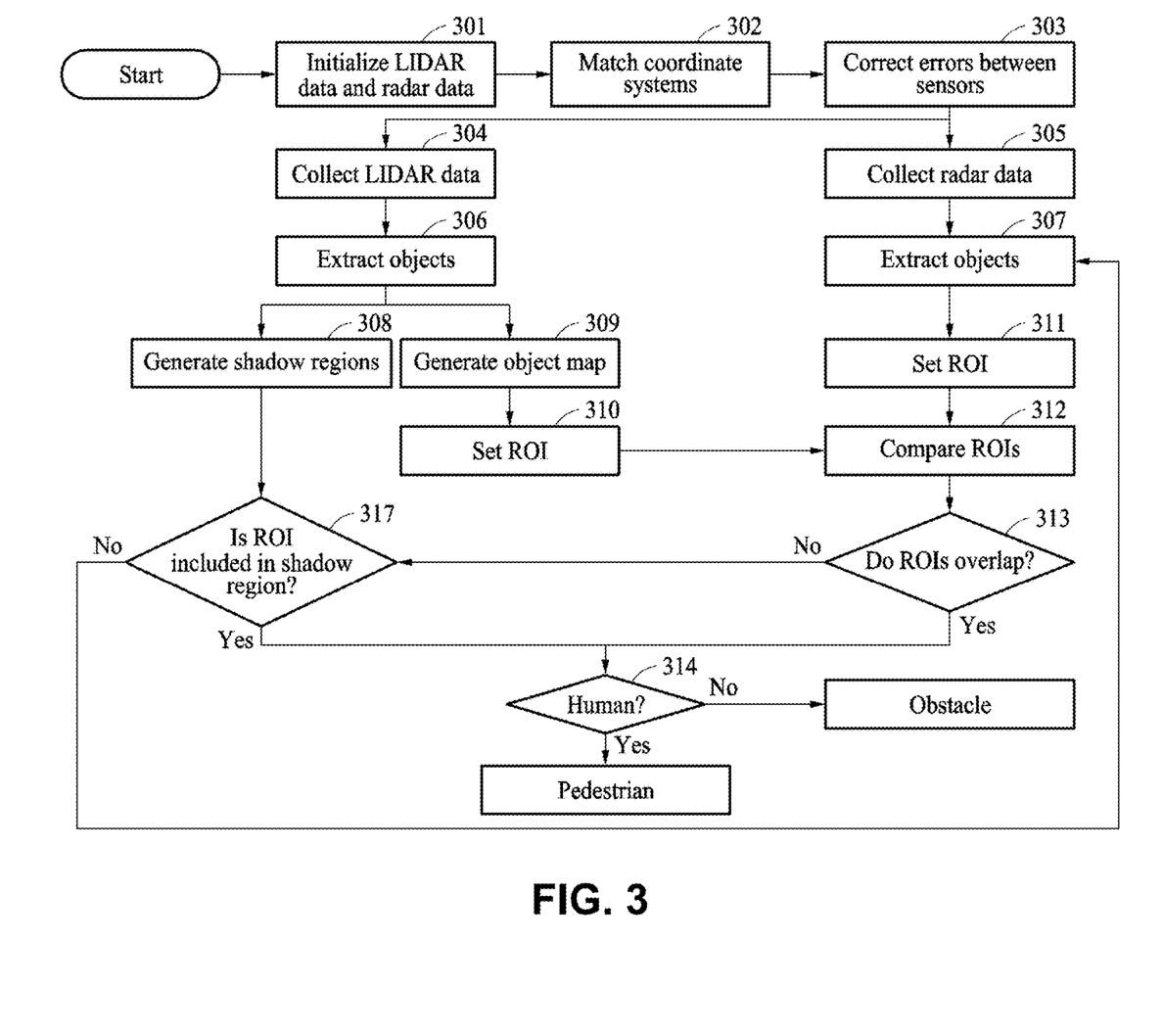
FIG. 3 is a flowchart illustrating an object detecting method performed by an object detecting apparatus according to an example embodiment.

FIG. 3 is a flowchart illustrating an object detecting method performed by an object detecting apparatus according to an example embodiment.

In operation 301, the object detecting apparatus 100 initializes LIDAR data and radar data obtained in a previous object detecting process by initializing the LIDAR sensor 110 and the radar sensor 120.

In operation 302, the object detecting apparatus 100 matches a coordinate system of the LIDAR data obtained through the LIDAR sensor 110 to a coordinate system of the radar data obtained through the radar sensor 120. In general, the LIDAR data obtainable through the LIDAR sensor 110 may be represented in a Cartesian coordinate system, and the radar data obtainable through the radar sensor 120 may be represented in a polar coordinate system. Thus, the object detecting apparatus 100 may convert the coordinate system of the radar data obtained through the radar sensor 120 to the Cartesian coordinate system of the LIDAR data.

In operation 303, the object detecting apparatus 100 corrects coordinate errors between the LIDAR sensor 110 and the radar sensor 120. In detail, the obtainable LIDAR data and the radar data may have different values even when the LIDAR sensor 110 and the radar sensor 120 detect an identical object based on initial locations of the LIDAR sensor 110 and the radar sensor 120. Thus, the object detecting apparatus 100 may correct errors of coordinates associated with the LIDAR data received from the LIDAR sensor 110 and the radar data received from the radar sensor 120 based on offsets caused by the initial locations of the LIDAR sensor 110 and the radar sensor 120. Here, the object detecting apparatus 100 may correct the errors of the coordinates associated with the LIDAR data and the coordinates associated with the radar data based on the LIDAR sensor 110 because the LIDAR sensor 110 has a better range accuracy than the radar sensor 120. However, the object detecting apparatus 100 may correct the error of the coordinates based on the LIDAR sensor 110 when the LIDAR sensor 110 operates within an operation range based on an effective light intensity. Otherwise, the corrector 101 may correct the errors of the coordinates based on the radar sensor 120.

In operation 304, the object detecting apparatus 100 collects the LIDAR data associated with a search region in which objects are to be found. Here, the LIDAR data obtained through the object detecting apparatus 100 may be data in which the errors are corrected based on the offsets caused by the initial locations of the LIDAR sensor 110 and the radar sensor 120.

In operation 305, the object detecting apparatus 100 collects the radar data associated with the search region in which the objects are to be found. Here, the radar data collected through the object detecting apparatus 100 may be data in which the errors are corrected based on the offsets caused by the initial locations of the LIDAR sensor 110 and the radar sensor 120.

In operation 306, the object detecting apparatus 100 extracts the objects present within the search region based on the collected LIDAR data.

In operation 307, the object detecting apparatus 100 extracts the objects present within the search region based on the collected radar data.

In operation 308, the object detecting apparatus 100 generates shadow regions as back portions of the extracted objects. A shadow region may indicate a region through which a laser signal output by the LIDAR sensor 110 does not pass from the search region.

In operation 309, the object detecting apparatus 100 generates an object map that is mapped in order to represent the LIDAR data on a display as an image based on the extracted objects.

In operation 310, the object detecting apparatus 100 sets a region of interest (ROI) of the LIDAR sensor 110 based on Cartesian coordinates corresponding to the extracted objects. Here, the ROI may indicate a region in which an object is to be present based on the collected LIDAR data.

In detail, the object detecting apparatus 100 may set the ROI of each of the LIDAR sensor 110 and the radar sensor 120 based on different methods. The LIDAR sensor 110 may have a better lateral range accuracy. Thus, the object detecting apparatus 100 may set a lateral size of the ROI of the LIDAR sensor 110 to be a predetermined size determined based on a unique accuracy feature of the LIDAR sensor 110. The object detecting apparatus 100 may variably set a longitudinal size of the ROI based on a relative range between a target and the LIDAR sensor 110. That is, the object detecting apparatus 100 may increase the longitudinal size of the ROI by applying a predetermined weight based on the relative range between the target and the LIDAR sensor 110.

Unlike the LIDAR sensor 110, the radar sensor 120 may have a better longitudinal range accuracy. Thus, the object detecting apparatus 100 may set a longitudinal size of the ROI of the radar sensor 120 to be a predetermined size determined based on a unique accuracy feature of the radar sensor 120. The object detecting apparatus 100 may variably set a lateral size of the ROI based on a relative range between the target and the radar sensor 120. That is, the object detecting apparatus 100 may increase the lateral size of the ROI by applying the predetermined weight based on the relative range between the target and the radar sensor 120.

In operation 311, the object detecting apparatus 100 sets the ROI of the radar sensor 120 based on the objects extracted in operation 307. In more detail, the object detecting apparatus 100 may differentiate a static object from objects moving in response to speeds of the objects extracted in operation 307. Subsequently, the object detecting apparatus 100 may set an ROI based on a radar cross section (RCS) depending on a range and a movement speed of the moving object.

In operation 312, the object detecting apparatus 100 compares the ROI of the LIDAR sensor 110 set in operation 310 to the ROI of the radar sensor 120 set in operation 311.

In operation 313, the object detecting apparatus 100 verifies that the moving object is present within an overlapping ROI when the ROI of the LIDAR sensor 110 overlaps the ROI of the radar sensor 120. Subsequently, the object detecting apparatus 100 displays a more accurate location of the moving object on a display of the LIDAR sensor 110 by extracting information on a range between the moving object and the radar sensor 120 based on the radar data, and extracting information on a horizontal angle of the moving object relative to the LIDAR sensor 110 based on the LIDAR data.

However, when the ROI of the LIDAR sensor 110 does not overlap the ROI of the radar sensor 120, the object detecting apparatus 100 may compare the shadow region associated with the LIDAR sensor 110 to the ROI of the radar sensor 120 in operation 317. Here, when the ROI of the radar sensor 120 overlaps the shadow region associated with the LIDAR sensor 110, the object detecting apparatus 100 may verify that the moving object is present within the overlapping shadow region. Subsequently, the object detecting apparatus 100 may represent that an object occluded by an obstacle is present in the search region by displaying the ROI of the radar sensor 120 overlaid to the display of the LIDAR sensor 110.

In operation 314, the object detecting apparatus 100 verifies whether the extracted moving objects are humans based on a result of the comparing of the ROI of the LIDAR sensor 110 to the ROI of the radar sensor 120. For example, when detecting an object on a general road, the object detecting apparatus 100 recognizes an object as a pedestrian in response to an extracted object being verified to be a human, and recognizes the object as an obstacle or an unknown object in response to the extracted object being verified not to be a human.

Thus, the present disclosure may extract an ROI of a moving object associated with the radar sensor 120 among ROIs of the LIDAR sensor 110 and recognize an object in the extracted ROI as a moving object. Based on such a method, in comparison to the LIDAR sensor 110 performing a recognition process on all ROIs, the radar sensor 120 may extract an ROI corresponding to a moving object based on a preset reference, for example, a radar cross section (RCS) depending on a range and a movement speed, and an amount of time processing and an operation amount of the LIDAR sensor 110 may be reduced by performing the recognition process.

In addition, the object detecting apparatus 100 may detect a moving object in a more robust manner by estimating an object which is undetectable due to an obstacle using the radar sensor 120.

According to example embodiments, it is possible to reduce an amount of time processing and an operation amount of a LIDAR sensor and detect a partially occluded object using an object detecting apparatus in which the LIDAR sensor and a radar sensor are combined.

The units described herein may be implemented using hardware components, software components, and/or a combination thereof. For example, the units and components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An object detecting method performed by a processor using a light detection and ranging (LIDAR) sensor and a radar sensor, the method comprising:
    collecting LIDAR data and radar data associated with a search region in which objects are to be found using the LIDAR sensor and the radar sensor;
    extracting each of the objects present within the search region based on the collected LIDAR data and the collected radar data;
    generating shadow regions of the objects extracted through the LIDAR sensor and setting a region of interest (ROI) of the LIDAR sensor based on the extracted objects;
    setting an ROI of the radar sensor based on a reflectivity depending on a range and a movement speed of a moving object among the objects extracted through the radar sensor;
    comparing the ROI of the LIDAR sensor to the ROI of the radar sensor;
    verifying whether the moving object is present based on a result of the comparing of the ROI of the LIDAR sensor to the ROI of the radar sensor; and
    displaying the moving object on a display coupled to the LIDAR sensor based on information on a horizontal angle of the moving object extracted through the LIDAR sensor and information on a range from the radar sensor to the moving object extracted through the radar sensor.

2. The method of claim 1, wherein the comparing comprises verifying whether the ROI of the LIDAR sensor overlaps the ROI of the radar sensor, and the verifying comprises verifying that the moving object is present within an overlapping ROI based on verification that the ROI of the LIDAR sensor overlaps the ROI of the radar sensor.

3. The method of claim 1, wherein the comparing comprises verifying whether a shadow region associated with the LIDAR sensor overlaps the ROI of the radar sensor when the set ROI of the LIDAR sensor does not overlap the ROI of the radar sensor, and
    the verifying comprises verifying that the moving object is present within an overlapping shadow region based on verification that the shadow region associated with the LIDAR sensor overlaps the ROI of the radar sensor.

4. The method of claim 1, wherein the setting of the ROI of the LIDAR sensor comprises setting a lateral size of the ROI of the LIDAR sensor to be a predetermined size determined based on a unique accuracy of the LIDAR sensor, and variably setting a longitudinal size of the ROI of the LIDAR sensor based on a relative range between a target and the LIDAR sensor.

5. The method of claim 1, wherein the setting of the ROI of the radar sensor comprises setting a longitudinal size of the ROI of the radar sensor to be a predetermined size determined based on a unique accuracy of the radar sensor, and variably setting a lateral size of the ROI of the radar sensor based on a relative range between a target and the radar sensor.

6. The method of claim 1, further comprising:
    correcting errors of coordinates associated with the LIDAR data received from the LIDAR sensor and the radar data received from the radar sensor based on offsets caused by initial locations of the LIDAR sensor and the radar sensor, and
    wherein the extracting comprises extracting each of the objects present within the search region based on the LIDAR data and the radar data in which the errors of coordinates are corrected.

7. The method of claim 1, wherein the processor is caused to perform the method by executing computer-readable instructions stored on a non-transitory computer readable medium.

8. An object detecting apparatus using a light detection and ranging (LIDAR) sensor and a radar sensor, the apparatus comprising:
    a processor, the processor comprising:
    a collector configured to collect LIDAR data and radar data associated with a search region in which objects are to be found using the LIDAR sensor and the radar sensor;
    an extractor configured to extract each of the objects present within the search region based on the collected LIDAR data and the collected radar data;
    a setter configured to generate shadow regions of the objects extracted through the LIDAR sensor, set a region of interest (ROI) of the LIDAR sensor based on the extracted objects, and set an ROI of the radar sensor based on a reflectivity depending on a range and a movement speed of a moving object among the objects extracted through the radar sensor;
    a comparer configured to compare the ROI of the LIDAR sensor to the ROI of the radar sensor; and
    a verifier configured to verify whether the moving object is present based on a result of the comparing of the ROI of the LIDAR sensor to the ROI of the radar sensor;
    wherein the processor displays the moving object on a display coupled to the LIDAR sensor based on information on a horizontal angle of the moving object extracted through the LIDAR sensor and information on a range from the radar sensor to the moving object extracted through the radar sensor.

9. The apparatus of claim 8, wherein the comparer is configured to verify whether the ROI of the LIDAR sensor overlaps the ROI of the radar sensor, and the verifier is configured to verify that the moving object is present within an overlapping ROI based on verification that the ROI of the LIDAR sensor overlaps the ROI of the radar sensor.

10. The apparatus of claim 8, wherein the comparer is configured to verify whether a shadow region associated with the LIDAR sensor overlaps the ROI of the radar sensor when the set ROI of the LIDAR sensor does not overlap the ROI of the radar sensor, and the verifier is configured to verify that the moving object is present within an overlapping shadow region based on verification that the shadow region associated with the LIDAR sensor overlaps the ROI of the radar sensor.

11. The apparatus of claim 8, wherein the setter is configured to set a lateral size of the ROI of the LIDAR sensor to be a predetermined size determined based on a unique accuracy of the LIDAR sensor, and variably set a longitudinal size of the ROI of the LIDAR sensor based on a relative range between a target and the LIDAR sensor.

12. The apparatus of claim 8, wherein the setter is configured to set a longitudinal size of the ROI of the radar sensor to be a predetermined size determined based on a unique accuracy of the radar sensor, and variably set a lateral size of the ROI of the radar sensor based on a relative range between a target and the radar sensor.

13. The apparatus of claim 8, further comprising:

a corrector configured to correct errors of coordinates associated with the LIDAR data received from the LIDAR sensor and the radar data received from the radar sensor based on offsets caused by initial locations of the LIDAR sensor and the radar sensor, and wherein the extractor is configured to extract each of the objects present within the search region based on the LIDAR data and the radar data in which the errors of coordinates are corrected.

* * * * *